Patented Sept. 25, 1928.

1,685,231

UNITED STATES PATENT OFFICE.

WILLIAM H. HOWARD, OF SALT LAKE CITY, UTAH.

RECOVERY OF SULPHUR.

No Drawing. Application filed August 20, 1927. Serial No. 214,445.

This invention relates to the recovery of sulphur from gases and has for its object the provision of an improved method of recovering sulphur from gases containing sulphur dioxide. More particularly, the invention aims to provide an improved method for recovering elemental sulphur from gases resulting from the smelting, roasting or calcining of pyrite ores or other sulphur bearing materials.

It is known that when gases containing sulphur dioxide are passed through a highly heated body of coke or other carbonaceous reducing material, the sulphur dioxide may be decomposed and elemental sulphur may be liberated. The reaction involved in this reduction may be represented as follows:

$$SO_2 + C = S + CO_2$$

It has been found in practice that in order that the reduction of sulphur dioxide may take place rapidly and practically, the body of reducing material must be maintained at a temperature above 1000° C. and preferably between 1200° C. and 1300° C.

The furnace gases usually contain 6% to 8% sulphur dioxide, 8% to 12% oxygen, small amounts of carbon dioxide and sulphur trioxide, and relatively large amounts of nitrogen. The gases contain insufficient oxygen to support combustion sufficiently to maintain the required temperature for the reducing action when they are passed from the furnace through the bed of carbonaceous material.

The present invention is based on the transfer of the sulphur dioxide of impure furnace gases to a stream of pure air to produce a satisfactory combustion supporting gas. I have developed a practical process for recovering sulphur in which the sulphur dioxide contained in a stream of impure furnace gases is transferred to a stream of air to produce a gas which preferably contains substantially the same concentration of sulphur dioxide as the original furnace gases, and which, by virtue of the fact that it contains a relatively large amount of free oxygen, is capable of supporting combustion of the carbonaceous material sufficiently to produce the required reducing temperature.

In the practice of the invention, I prefer to wash the furnace gases with water in a counter-current system for the purpose of dissolving the sulphur dioxide. The solution of sulphur dioxide thus formed is then brought into contact with air in a second counter-current system for the purpose of transferring the sulphur dioxide from the solution to the air. The resulting mixture of air and sulphur dioxide is then passed through an incandescent bed of coke or other carbonaceous material at such a rate that a temperature of 1200° to 1300° C. is maintained. During the passage of the gas mixture through the incandescent bed of carbonaceous material, substantially all of the sulphur dioxide is reduced and elemental sulphur is formed. The sulphur thus produced may be collected in suitable flues or chambers provided for that purpose.

For the absorption of the sulphur dioxide from the furnace gases and the removal of the sulphur dioxide from solution, I prefer to use packed towers similar to the Gay-Lussac towers in common use in sulphuric acid plants. The water or other liquid solvent is introduced into the first tower at the top and flows downwardly in contact with an ascending current of furnace gases. The tower is of such size and the flow of gases and liquid therethrough is so regulated that the sulphur dioxide of the solution, which is withdrawn from the bottom of the tower adjacent the point of entry of the furnace gases, is in substantial equilibrium with the sulphur dioxide of the entering furnace gases.

The sulphur dioxide solution from the first tower may be conducted in any suitable manner to the top of a second tower and allowed to flow downwardly therethrough in contact with an ascending current of air. The air enters at the bottom of the second tower and becomes laden with sulphur dioxide from the solution as it progresses upwardly therethrough. The second tower is of such size and the flow of solution and air therethrough is so regulated that the sulphur dioxide of the entering solution is in substantial equilibrium with the sulphur dioxide of the air leaving the tower. Thus, since the sulphur dioxide of the solution is in substantial equilibrium with the sulphur dioxide in the furnace gases and the sulphur dioxide of the enriched air, the sulphur dioxide content of the enriched air is substantially the same as the sulphur dioxide content of the furnace gases.

The impoverished liquid solvent may be continuously returned from the second tower to the absorbing tower, or it may be wasted, as desired.

As explained above, the enriched air is passed through an incandescent bed of carbonaceous material for the purpose of reducing the sulphur dioxide, and, prior to its passage through the incandescent bed, it may be dried and/or heated or not, as desired.

Under certain conditions, as for example, when the furnace gases contain large amounts of suspended solid matter and/or sulphur trioxide, it may be desirable to wash the gases before they enter the absorption tower. For this purpose the gases may be first passed through a dust chamber and then through a tower in which a saturated solution of sulphur dioxide in water is circulated. The flow of air through the evolving tower, in contact with the sulphur dioxide solution, may be so regulated that the concentration of sulphur dioxide in the resulting mixture of air and sulphur dioxide is less than in the furnace gases. The concentration of sulphur dioxide in the mixture of air and sulphur dioxide may be increased by heating the solution prior to its contact with the current of air.

I claim:

1. The method of recovering sulphur from furnace gases containing sulphur dioxide which comprises passing the furnace gases in contact with a body of water to form a solution of sulphur dioxide, passing a current of air in contact with the sulphur dioxide solution to form a mixture of air and sulphur dioxide, and subjecting the mixture of air and sulphur dioxide to the action of incandescent carbonaceous material.

2. The method of recovering sulphur from furnace gases containing sulphur dioxide which comprises passing the furnace gases in contact with a body of water to form a solution of sulphur dioxide, passing a current of air in contact with the sulphur dioxide solution to form a mixture of air and sulphur dioxide, and passing the mixture of air and sulphur dioxide through a bed of incandescent coke.

3. The method of recovering sulphur from gases containing sulphur dioxide which comprises transferring the sulphur dioxide to a body of liquid solvent, removing the sulphur dioxide from the liquid solvent by means of a stream of air, and reducing the sulphur dioxide to form elemental sulphur.

4. The method of recovering sulphur from furnace gases containing sulphur dioxide which comprises transferring the sulphur dioxide to a body of air by first circulating a liquid solvent in contact with the furnace gases and then circulating the solvent in contact with a current of air, and passing the resulting mixture of air and sulphur dioxide through a bed of incandescent carbonaceous material.

5. The method of recovering sulphur from gases containing sulphur dioxide which comprises transferring the sulphur dioxide to a body of water, vaporizing sulphur dioxide from the resulting aqueous solution by the action between counter-currents of said aqueous solution and air and thereby obtaining a gaseous mixture of sulphur dioxide and air capable of maintaining incandescent carbonaceous material at a temperature sufficiently high to reduce sulphur dioxide, and passing said mixture of sulphur dioxide and air through a body of incandescent carbonaceous material.

6. The method of recovering sulphur from furnace gases containing sulphur dioxide which comprises passing the furnace gases and a liquid capable of dissolving sulphur dioxide in counter-current relationship to form a solution of sulphur dioxide, passing the resulting solution and a body of air in counter-current relationship to form a mixture of gases containing sulphur dioxide and air, and passing the resulting mixture of gases through a bed of incandescent carbonaceous material.

7. The method of recovering sulphur from gases containing sulpur dioxide which comprises transferring the sulphur dioxide to a body of liquid solvent, passing the resulting solution and a stream of air in counter-current relationship to form a mixture of sulphur dioxide and air containing substantially the same concentration of sulphur dioxide as the original gases, and subjecting the resulting mixture of air and sulphur dioxide to the action of incandenscent carbonaceous material.

In testimony whereof I affix my signature.

WILLIAM H. HOWARD.